Nov. 3, 1925.
W. O. OLSON
1,560,299
MULTIPLE LUBRICATOR
Filed Feb. 7, 1920
2 Sheets-Sheet 1
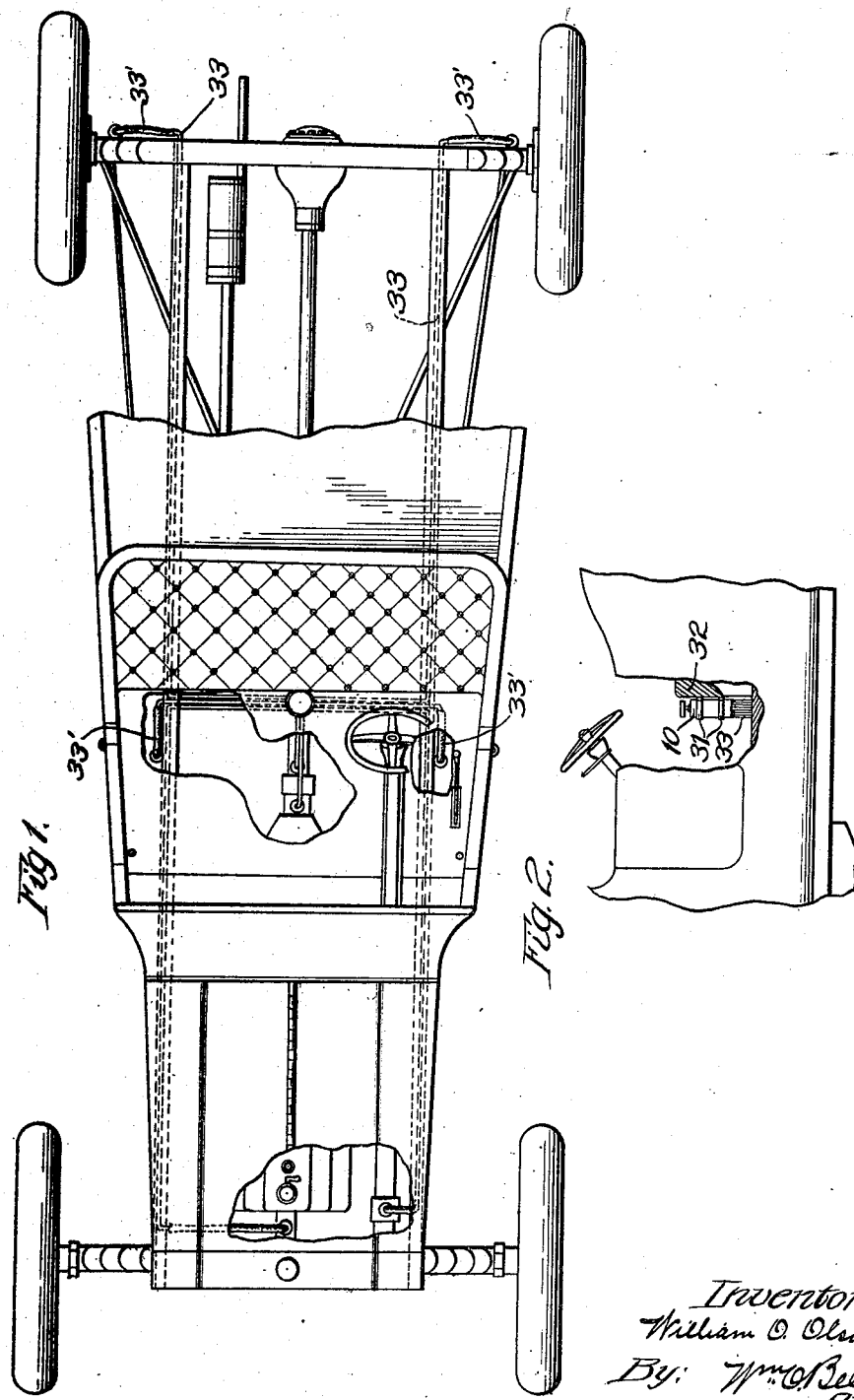

Nov. 3, 1925.                          1,560,299
W. O. OLSON
MULTIPLE LUBRICATOR
Filed Feb. 7, 1920          2 Sheets-Sheet 2
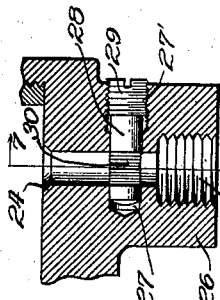
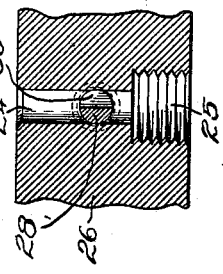
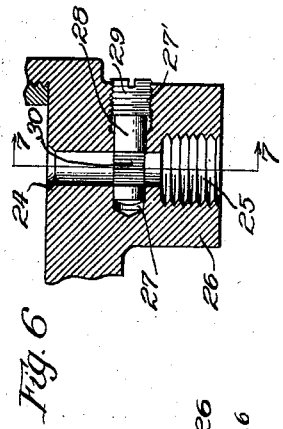
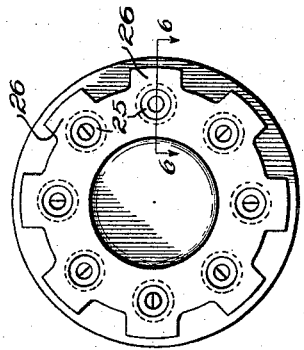
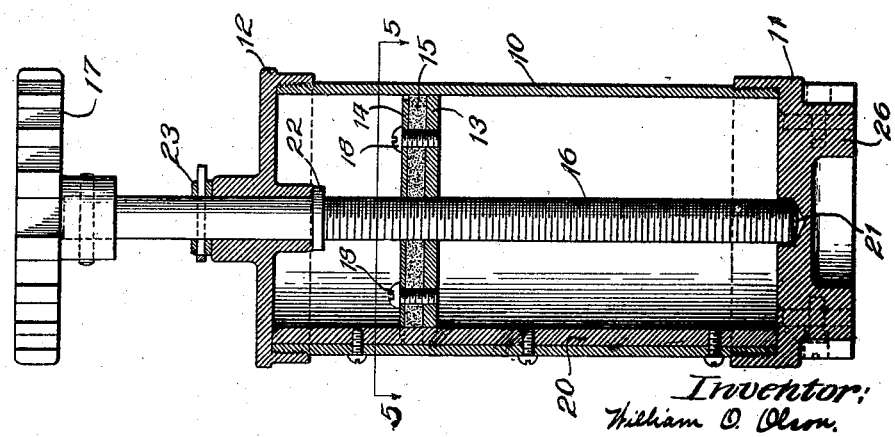
Inventor;
William O. Olson.
By: Wm. C. Beek.
Atty.

Patented Nov. 3, 1925.

1,560,299

UNITED STATES PATENT OFFICE.

WILLIAM O. OLSON, OF CHICAGO, ILLINOIS.

MULTIPLE LUBRICATOR.

Application filed February 7, 1920. Serial No. 357,078.

*To all whom it may concern:*

Be it known that I, WILLIAM O. OLSON, a citizen of the United States, residing at Chicago, in the county of Cook and State of Illinois, have invented certain new and useful Improvements in Multiple Lubricators, of which the following is a specification.

This invention relates to lubricators for automobiles, trucks, and other wheeled vehicles which have a plurality of places to be regularly lubricated.

The object of the invention is to provide a device which may be located in a position for convenient operation by the driver whereby lubricant may be supplied by a single operation to all of the places to be lubricated on the vehicle.

And a further object of the invention is to insure the even distribution of lubricant to distant points as well as to points adjacent to the supply without necessitating adjustment or particular manipulation by the operator.

I have selected for illustrating my invention the chassis of a well-known automobile and have shown as much of the same as is necessary for a clear understanding of the application and use of the invention.

In the drawings:

Fig. 1 is a plan view of an automobile chassis showing my invention installed therein.

Fig. 2 is a side elevation of a portion of the automobile shown in Fig. 1.

Fig. 3 is a sectional elevation of the supply receptacle.

Fig. 4 is a bottom plan view of the supply receptacle.

Fig. 5 is a sectional view on the line 5—5 of Fig. 3.

Fig. 6 is a detail enlarged sectional view on the line 6—6 of Fig. 4.

Fig. 7 is a sectional view on the line 7—7 of Fig. 6.

Fig. 8 is a detail sectional view of one form of grease cup nipple that may be used.

Fig. 9 is a sectional view on the line 9—9 of Fig. 8.

Referring to the drawings 10 is a receptacle which may be made in any suitable size and shape and is provided with a distributing head 11 and a cap 12, both of which are screw threaded on the body of the receptacle. A plunger preferably comprising a lower steel disk 13, an upper bar 14 and an intermediate leather disk 15 is arranged to travel in the receptacle on the threaded stem 16 which projects through the cap and oppositely extending bearing bosses thereon and carries a hand wheel 17. The disks of the plunger are rigidly secured together by screws 18 or other suitable devices, and the plunger is provided with a notch 19 to engage a rib 20 fastened within the receptacle to form a guide for the plunger and prevent it turning with the stem. The stem is stepped at 21 in the distributing head, and it is provided with a shoulder 22 and a washer 23 keyed to the stem to hold the stem in proper position in the receptacle.

The distributing head is provided with a plurality of discharge passages 24 (Figs. 6, 7) which terminate in threaded sockets 25. These passages preferably extend straight through the distributing head in a direction parallel with the axis of the receptacle. The head preferably comprises an annular projecting rib portion 26 in which is located a plurality of transverse passages 27 opening at one end in the outer face of said annular portion. These passages 27 terminate in threaded sockets 27'. A regulator plug 28 is arranged in each passage 27 and it has a threaded outer end 29 to engage the threaded socket 27'. The regulator plug is cut away at 30 where it registers with the passage 24 when the parts are assembled. This cut-away portion comprises, in the present embodiment of my invention, approximately one-half of the cross sectional area of the plug, as appears in Fig. 7.

The receptacle may be fixedly or detachably mounted in any position on the automobile for operation. For example, it may be supported in straps 31 on the heel board 32 of the front seat so that it is readily accessible to the driver. Tubes 33 are engaged by any suitable nipples or other devices in the sockets 25 of the distributing head and connect with the grease points, or oil point as the case may be, to be lubricated on the car. I prefer to run the tubes from the receptacle along the frame of the chassis wherever possible. The tubes may comprise flexible sections 33' at the outer ends where they connect to the lubricating points of the chassis to accommodate for the relative movements of parts. Any sort of nipple may be employed such as indicated at 24, Fig. 8.

I have found that in a device of this character it is necessary to control the outflow of grease or oil from the receptacle to insure a proper distribution of the grease or oil to the several lubricating points, otherwise the grease or oil will be forced to the near points and the distant points will lack distribution. This results from the resistance afforded by the length of the tubes to the distant points and will naturally vary with the length of the tubes. Since it is not practically feasible to locate the receptacle in a position equally distant as to the length of the tubing from every point to be lubricated I provide for controlling and regulating the discharge of grease or oil from the tank by varying the size of the discharge passages as may be required to insure an even distribution of grease or oil. In other words for those lubricating points located close to the receptacle I provide contracted discharge passages and for those distant from the receptacle I provide larger passages, the size of the passage being determined by the distance the grease or oil has to travel from the receptacle and the amount of grease or oil required for a particular lubricating point. It will be understood from the foregoing that where my invention is intended to form a regular part of the standard equipment of an automobile, it can be made especially for that automobile with the discharge passages 24 bored to the right size for the lubricating points, but to make a standard device which can be adapted for many different automobiles I prefer to employ the construction specifically shown in the drawings comprising a plurality of discharge passages 24 of the same diameter, and regulating plugs intersecting the passages 24 and adjustable to vary the discharge from said passages as may be required. This is a simple form of construction which can be readily adjusted to meet the conditions which exist on the many different forms of chassis now common on the market. The regulating plug may be withdrawn from the passage 27, 27' and inserted in the threaded portion 27' in reverse position with its cut-away portion projecting outward from the distributing head when it is desired to leave the passage 24 entirely free and open.

I prefer to install the device in its complete form on an automobile. To fill the receptacle or gun with grease, the stem is turned to move the plunger to its upward limit of travel and then the body of the receptacle is removed from the head so that grease can be packed into the receptacle through its open end. Then the body is engaged again with the distributing head and as occasion may require, the hand wheel is operated to turn the threaded stem and force the plunger down. This exerts sufficient pressure upon the grease to force it out through the distributing head and the tubes to the several lubricating points, giving to each point the proper predetermined distribution of grease. However, the distributing head only, with or without any suitable cover, may be a fixed part of the installation and the parallel plunger and stem may be applied only from time to time as required to replenish the supply of grease in the tubes at the lubricating points. I contemplate that the device will be used principally for distributing grease, but it may be filled with oil and operated in much the same manner heretofore described. To fill the receptacle with oil it will, of course, be necessary to provide the body with a suitable oil hole and a closure plug.

I am aware that my invention may be embodied in many other forms than that shown in the drawings and heretofore described, and I therefore reserve the right to make all such changes as fairly fall within the scope of the following claim.

I claim:

A lubricator comprising an open ended cylindrical body threaded at opposite ends, a distributor head having a threaded cylindrical flange fitted to one end of the body, the outer face of the head having a cylindrical rib pierced by outlet passages communicating with the interior of the body, adjustable regulator plugs extending through the rib and transversely intersecting the respective outlet passages, a cap threaded upon the other end of the body and provided with a central opening having bearing bosses at opposite sides of the cap, a plunger working in the body, a rotatable shaft stepped in a socket in the inner face of the distributor head and extending through the said bosses and opening in the cap, said shaft being screw-threaded below the cap and extending through a screw-threaded opening in the plunger, an annular flange on the shaft and engaged with the inner end of the inner boss, and a handle on the outer end of the shaft.

WM. O. OLSON.